United States Patent
Reuter et al.

(10) Patent No.: US 7,232,007 B2
(45) Date of Patent: Jun. 19, 2007

(54) METHOD FOR OPERATING A POWER-ASSISTED HYDRAULIC STEERING SYSTEM IN A MOTOR VEHICLE

(75) Inventors: Robert Reuter, Munich (DE); Klaus Kolbeck, Starnberg (DE); Stefan Schott, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/391,184

(22) Filed: Mar. 29, 2006

(65) Prior Publication Data

US 2006/0175117 A1 Aug. 10, 2006

Related U.S. Application Data

(63) Continuation of application No. PCT/EP2004/052315, filed on Sep. 27, 2004.

(30) Foreign Application Priority Data

Sep. 30, 2003 (DE) ................. 103 45 293

(51) Int. Cl.
 *B62D 5/06* (2006.01)
(52) U.S. Cl. ..................... 180/421; 180/441
(58) Field of Classification Search ............ 180/442, 180/421, 419, 423, 441; 701/41, 42
 See application file for complete search history.

(56) References Cited

U.S. PATENT DOCUMENTS 4,409,789 A * 10/1983 Hansen et al. ............ 60/384
4,410,193 A * 10/1983 Howard ................... 280/90
4,557,342 A * 12/1985 Drutchas ................. 180/442
4,702,335 A * 10/1987 Cage et al. ............... 180/423
5,564,516 A * 10/1996 Nimblett et al. .......... 180/423
6,073,721 A     6/2000 Grabowski (Continued)

FOREIGN PATENT DOCUMENTS

DE         42 30 957 A1    3/1994

(Continued)

*Primary Examiner*—Tony Winner
(74) *Attorney, Agent, or Firm*—Crowell & Moring LLP

(57) ABSTRACT

A method of operating a power-assisted hydraulic steering system of a motor vehicle having a hydraulic pump mechanically driven by a vehicle drive assembly, and having an additional function which reduces the amount of power assistance at a high driving speed in comparison to the assistance at a low driving speed and, in the process, simultaneously increases the quantity of hydraulic medium circulated by way of the hydraulic assistance unit of the steering gear is provided. This additional function is activated independently of the driving speed also under operating conditions which may subject the hydraulic pump to extreme stress. For example, the additional function may be activated shortly before reaching the steering end stop, which can be detected by use of an appropriately arranged steering angle sensor. An activation also is possible if steering angles which are larger than a defined limit steering angle are set for a defined time period. Furthermore, this additional function may be activated when the temperature of the hydraulic medium and/or the pressure on the pump delivery side exceed(s) a certain limit value(s), as required, also as a function of time.

20 Claims, 1 Drawing Sheet

U.S. PATENT DOCUMENTS

| | | | |
|---|---|---|---|
| 6,874,793 B2* | 4/2005 | Choudhery | 280/5.521 |
| 6,988,581 B2* | 1/2006 | Croughs et al. | 180/442 |
| 7,070,019 B2* | 7/2006 | Takamoto et al. | 180/403 |
| 2003/0024757 A1* | 2/2003 | Ballester | 180/421 |
| 2005/0051378 A1 | 3/2005 | Merz | |

FOREIGN PATENT DOCUMENTS

| | | |
|---|---|---|
| DE | 102 11 396 A1 | 9/2003 |
| EP | 0 962 377 A2 | 12/1999 |
| EP | 1 331 156 A2 | 7/2003 |

* cited by examiner

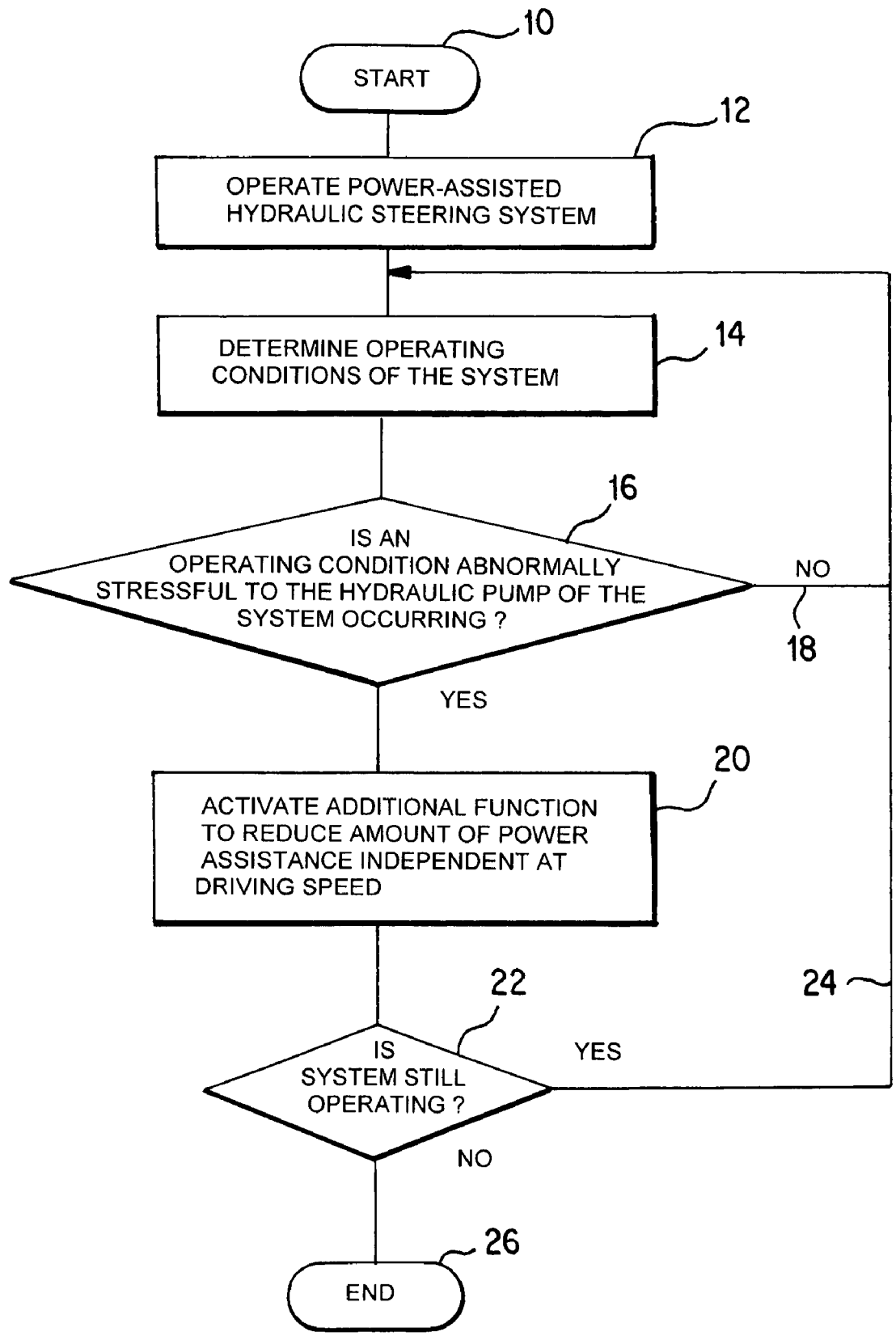

METHOD FOR OPERATING A POWER-ASSISTED HYDRAULIC STEERING SYSTEM IN A MOTOR VEHICLE

CROSS-REFERENCE TO RELATED APPLICATIONS

This application is a continuation of PCT Application No. PCT/EP2004/052315 filed on Sep. 27, 2004, which claims priority to German Application No. 103 45 293.1 filed Sep. 30, 2003, the disclosures of which are incorporated by reference herein.

BACKGROUND AND SUMMARY OF THE INVENTION

The invention relates to a method of operating a power-assisted hydraulic steering system of a motor vehicle, having a hydraulic pump mechanically driven by the vehicle drive assembly, and having an additional function which reduces the amount of power assistance at a high driving speed in comparison to the amount of power assistance at a low driving speed and, in the process, simultaneously increases the amount of the hydraulic medium circulated by way of the hydraulic assistance unit of the steering mechanism.

For the technical background, in addition to European Patent Document EP 0 962 377 A2 and U.S. Pat. No. 6,073,721, the specification of which is expressly incorporated by reference herein, reference is also made particularly to the system description of the Servotronic® of the SF steering systems known to a person skilled in the art.

Hydraulic steering systems having the characteristics noted above are offered by various steering system manufacturers and are characterized in that, the so-called additional function, i.e., the so-called characteristic manual steering moment-pressure valve, curve of a power steering valve can be changed or is changed as a function of the driving speed of the motor vehicle. In the standing position or at a low driving speeds (for example, when parking), such a speed-dependent hydraulic steering makes it possible for the driver of the vehicle to comfortably steer through as a result of a high power assistance moment and, at higher driving speeds, offers a good acknowledgement because of a reduced or low assistance moment.

In the case of known hydraulic steering systems having the characteristics noted above, the pressure in the hydraulic system may rise considerably under certain operating conditions when only a small hydraulic quantity is guided by way of the so-called hydraulic power assistance unit of the steering mechanism—this is normally a piston cylinder unit which is connected in series, for example, with a toothed rack of the mechanical toothed-rack steering gear. In this case, the hydraulic pump of the hydraulic steering system is operated at an unchanged pumping capacity or at a pumping capacity which is a function of the rotational speed of the vehicle drive assembly driving this pump, so that quasi-excess pumping capacity is converted to thermal energy for the most part inside the pump, whereby the pump is subjected to extreme stress or, in extreme cases, may even be damaged.

The present invention provides remedies for the above-described problems.

One aspect of the invention provides a power-assisted hydraulic steering system having a hydraulic pump mechanically driven by the vehicle drive assembly, and having an additional function which reduces the amount of power assistance at a high driving speed in comparison to the amount of power assistance at a low driving speed and, in the process, simultaneously increases the amount of the hydraulic medium circulated by way of the hydraulic assistance unit of the steering mechanism. The above-mentioned additional function is activated independently of the driving speed also under operating conditions which could subject the hydraulic pump to extreme stress. Different operating conditions of this type are described and claimed herein.

Other objects, advantages and novel features of the present invention will become apparent from the following detailed description of the invention when considered in conjunction with the accompanying drawings.

BRIEF DESCRIPTION OF THE DRAWING

The single FIGURE is a schematic flow chart illustrating the method of operating a power-assisted hydraulic steering system of a motor vehicle in accordance with the present invention.

DETAILED DESCRIPTION OF THE DRAWING

Thus, according to the invention, in operating conditions which are "critical" for the hydraulic pump, even when the driving speeds are low or very low, the above-mentioned additional function is activated, which otherwise is activated only at fairly high or at high driving speeds. Since, in the known steering systems, the active additional function circulates a fairly large amount of hydraulic medium by way of the steering mechanism or the hydraulic power assistance unit (such as a servo unit) assigned thereto, the thermal energy generated in the hydraulic pump is removed in an improved manner and the pump is thereby protected from overheating.

The FIGURE provides a schematic simplified flow chart of the method of operating the power-assisted hydraulic steering system according to the invention. After starting (step 10), the power-assisted hydraulic steering system of the motor vehicle is in operation (step 12). The method determines operating conditions associated with the hydraulic steering system (step 14). The method checks whether an operating condition is present that may subject a hydraulic pump of the hydraulic steering system to an abnormal or extreme amount of stress (step 16). If such an operating condition is not present, the method loops 18 and continues to determine the operating conditions of the system. If, however, an operating condition is present that is abnormally stressful to the hydraulic pump, then the method proceeds to activate an additional function to reduce the amount of power assistance. This additional function is activated independently of the driving speed of the vehicle (step 20), in that regard, this operation of the additional function is independent of any activation of the additional function that otherwise occurs, for example, only at fairly high or high driving speeds. Following the activation of the additional function, if the power-assisted hydraulic steering system is still being operated (step 22), the method returns to continue determining the operating conditions of the system (loop 24). Otherwise, the method ends (step 26).

It is pointed out that the above-mentioned additional function is preferably not constructed as a step function but can permit a virtually continuous change of the amount of the power assistance and/or particularly of the quantity of hydraulic medium circulated by way of the hydraulic assistance unit. Thus, when there is a risk of pump damage, that is, under operating conditions resulting in extreme stress to the hydraulic pump, the quantity of the hydraulic medium circulated by way of the hydraulic power assistance unit can be adjusted in a quasi-targeted manner such that the heat occurring in the hydraulic pump is sufficiently removed. Here, adjustments are definitely contemplated by which the above-mentioned effect is achieved without requiring the driver to do without the power assistance sufficient for him.

In particular, the above-mentioned additional function can also be activated shortly before a steering end stop is reached, which can be detected by an appropriately arranged steering angle sensor, for example. Specifically, one operating condition in which the hydraulic pump is subjected to extreme stress is a parking operation, particularly—and this is a frequent occurrence when parking—if the steering is actuated to the end stop; that is, the maximal steering angle is set. Whether the steering angle, in each case, desired or adjusted by the driver, is already close to the maximal steering angle and therefore close to the steering end stop can be simply determined in an electric or electronic manner by use of a normal steering angle sensor, which is often already present because of other demands or functions. With the approach to the end stop, according to the invention, if a change-over takes place from the so-called characteristic manual steering moment-pressure value curve for extremely low driving speeds, triggered by a simple electronic control unit analyzing the signals of the steering angle sensor, to the characteristic manual steering moment-pressure valve curve for high driving speeds, then two advantageous effects will occur simultaneously. On the one hand, this increases—as described above—the volume flow rate circulated by way of the hydraulic assistance unit. On the other hand, the steering assistance detectable by the driver is clearly reduced so that it is thereby signaled to the driver that the steering angle is very close to the end stop or could already have reached it, whereupon the driver will not further operate his steering wheel and thus will not continue to enlarge the steering angle. The driver of the vehicle therefore already "senses a stop" shortly before reaching the mechanical steering end stop whereby the stressing and the power absorption of the hydraulic pump is (additionally) reduced as a result of the decreased pressure in the hydraulic system. Here, it should be pointed out that it is not absolutely necessary for the driver to sense an end stop but that possibly a slight increase of the quantity of circulated hydraulic medium may be sufficient for reducing the stress on the pump to an acceptable degree as a result of an increased removal of heat.

Although, in connection with reaching the end stop, a so-called hydraulic steering limitation is known and basically customary on hydraulic steering systems, in which case, by way of special connection cross-sections in the hydraulic assistance unit, hydraulic medium is transferred from its high-pressure part into its return flow part, this hydraulic steering limitation may lead to noise problems and, in exceptional cases, also to function problems. This is avoided when the operating method according to the invention is used. Furthermore, it is known from European Patent document EP 0 962 377 A to reduce, in the case of a hydraulic steering system with an electromotively driven hydraulic pump, its pumping capacity when approaching the steering end stop by decreasing the rotational speed of the electric motor; however, this method cannot simply be applied to a hydraulic pump driven by the vehicle drive assembly. The reason is that, for this purpose, a high-expenditure transmission with a changeable ratio would have to be provided, which is not necessary with the present invention.

It is an advantageous development for the above-mentioned additional function, specifically the change-over to the characteristic manual steering moment-pressure valve curve for fairly high or high driving speeds, to be activated also at low driving speeds and particularly under critical measurable conditions. Such a condition is characterized in that steering angles which are larger than a certain limit steering angle are set for a certain time period. Here also, the steering angle is therefore determined and, in addition, the corresponding stress duration of the hydraulic steering system is entered. The respective limit values, thus, the limit steering angle and the pertaining defined time period, may be determined, for example, in a simple series of tests and may be stored in an electronic control unit of the motor vehicle.

It is also contemplated or advantageous to activate the above-mentioned additional function when the temperature of the hydraulic medium exceeds a certain limit temperature and/or when the hydraulic pressure, particularly on the delivery side of the hydraulic pump, exceeds a certain limit pressure. Corresponding measurements can easily be carried out by use of suitable sensors. Here, a time dependence may also be implemented such that the above-mentioned additional function is activated if the hydraulic pressure on the delivery side of the hydraulic pump exceeds a defined limit pressure for a certain time period. Likewise, the above-mentioned additional function may be activated, that is, also at lower driving speeds it may be changed over to the characteristic manual steering movement-pressure value curve for high driving speeds, if, for a defined time period, the temperature of the hydraulic medium exceeds a defined limit temperature and the hydraulic pressure on the delivery side of the hydraulic pump exceeds a certain limit pressure.

By operating in this manner, an overheating of the hydraulic pump, as well as a possibly resulting failure of the steering assistance, can be avoided. The service life of the hydraulic pump is increased and the (situation with respect to the development of noise) is improved, particularly with respect to the previous hydraulic limit stop; the latter may even be omitted. In this case, the operating method may be implemented in a simple manner and without great additional expenditures.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a power-assisted hydraulic steering system of a motor vehicle, the power-assisted hydraulic steering system being mechanically drivable by a vehicle drive assembly, and having an additional function which reduces an amount of power assistance provided at a high driving speed in comparison to the amount of power assistance provided at a low driving speed and, in the process, simultaneously increases a quantity of hydraulic medium circulated by way of a hydraulic assistance unit of a steering mechanism, the method comprising the acts of:

determining operating conditions of the vehicle which may subject the hydraulic pump of the power-assisted hydraulic steering system to abnormal stress; and activating the additional function which reduces the amount of power assistance, the additional function being activated independently of a driving speed of the vehicle.

2. The operating method according to claim 1, further comprising the acts of:
  detecting whether the steering mechanism is approaching a steering end stop via an operatively arranged steering angle sensor; and
  activating the additional function shortly before the steering mechanism reaches the steering end stop.

3. The operating method according to claim 2, further comprising the acts of:
  determining whether steering angles, which are larger than a defined limit steering angle, are set for a defined time period; and
  activating the additional function when the steering angles are set for the defined time period.

4. The operating method according to claim 2, wherein the additional function is activated when a temperature of the hydraulic medium exceeds a defined limit temperature.

5. The operating method according to claim 2, wherein the additional function is activated when a hydraulic pressure on a delivery side of the hydraulic pump exceeds a defined limit pressure.

6. The operating method according to claim 2, wherein the additional function is activated when a hydraulic pressure on a delivery side of the hydraulic pump exceeds a defined limit pressure for a certain time period.

7. The operating method according to claim 2, wherein the additional function is activated when, for a defined time period, a temperature of the hydraulic medium exceeds a defined limit temperature and a hydraulic pressure on a delivery side of the hydraulic pump exceeds a defined limit pressure.

8. The operating method according to claim 2, wherein the additional function operates to permit a substantially continuous change of the amount of power assistance and/or the quantity of hydraulic medium circulated by way of the hydraulic assistance unit, the additional function not being a step function.

9. The operating method according to claim 1, further comprising the acts of:
  determining whether steering angles, which are larger than a defined limit steering angle, are set for a defined time period; and
  activating the additional function when the steering angles are set for the defined time period.

10. The operating method according to claim 3, wherein the additional function is activated when a temperature of the hydraulic medium exceeds a defined limit temperature.

11. The operating method according to claim 3, wherein the additional function is activated when a hydraulic pressure on a delivery side of the hydraulic pump exceeds a defined limit pressure.

12. The operating method according to claim 3, wherein the additional function is activated when a hydraulic pressure on a delivery side of the hydraulic pump exceeds a defined limit pressure for a certain time period.

13. The operating method according to claim 3, wherein the additional function is activated when, for a defined time period, a temperature of the hydraulic medium exceeds a defined limit temperature and a hydraulic pressure on a delivery side of the hydraulic pump exceeds a defined limit pressure.

14. The operating method according to claim 1, wherein the additional function is activated when a temperature of the hydraulic medium exceeds a defined limit temperature.

15. The operating method according to claim 14, wherein the additional function is activated when a hydraulic pressure on a delivery side of the hydraulic pump exceeds a defined limit pressure.

16. The operating method according to claim 14, wherein the additional function is activated when a hydraulic pressure on a delivery side of the hydraulic pump exceeds a defined limit pressure for a certain time period.

17. The operating method according to claim 1, wherein the additional function is activated when a hydraulic pressure on a delivery side of the hydraulic pump exceeds a defined limit pressure.

18. The operating method according to claim 1, wherein the additional function is activated when a hydraulic pressure on a delivery side of the hydraulic pump exceeds a defined limit pressure for a certain time period.

19. The operating method according to claim 1, wherein the additional function is activated when, for a defined time period, a temperature of the hydraulic medium exceeds a defined limit temperature and a hydraulic pressure on a delivery side of the hydraulic pump exceeds a defined limit pressure.

20. The operating method according to claim 1, wherein the additional function operates to permit a substantially continuous change of the amount of power assistance and/or the quantity of hydraulic medium circulated by way of the hydraulic assistance unit, the additional function not being a step function.

* * * * *